(12) United States Patent
Zhang

(10) Patent No.: US 9,509,851 B2
(45) Date of Patent: Nov. 29, 2016

(54) INFORMATION PROCESSING METHOD AND ELECTRONIC DEVICE

(71) Applicants: Beijing Lenovo Software Ltd., Beijing (CN); Lenovo (Beijing) Co., Ltd., Beijing (CN)

(72) Inventor: Xueyuan Zhang, Beijing (CN)

(73) Assignees: Beijing Lenovo Software Ltd., Beijing (CN); Lenovo (Beijing) Co., Ltd., Beijing (CN)

( * ) Notice: Subject to any disclaimer, the term of this patent is extended or adjusted under 35 U.S.C. 154(b) by 151 days.

(21) Appl. No.: 14/487,238

(22) Filed: Sep. 16, 2014

(65) Prior Publication Data

US 2015/0256682 A1 Sep. 10, 2015

(30) Foreign Application Priority Data

Mar. 6, 2014 (CN) .......................... 2014 1 0080825

(51) Int. Cl.
*H04N 7/14* (2006.01)
*H04M 3/56* (2006.01)

(52) U.S. Cl.
CPC ............... *H04M 3/567* (2013.01); *H04M 3/56* (2013.01)

(58) Field of Classification Search
CPC ............... H04M 3/56–3/569; H04M 2203/50; H04M 2203/509
USPC ................... 348/14.01–14.16; 370/259–271, 370/351–357; 379/201.01, 202.01–207.01; 709/201–207, 217–248
See application file for complete search history.

(56) References Cited

U.S. PATENT DOCUMENTS

| | | | | |
|---|---|---|---|---|
| 5,717,168 A | * | 2/1998 | DeBuisser | G06F 3/043 178/18.04 |
| 6,333,973 B1 | * | 12/2001 | Smith | H04M 1/576 379/67.1 |
| 6,906,741 B2 | * | 6/2005 | Canova, Jr. | G06F 1/1626 348/14.01 |
| 7,525,536 B2 | * | 4/2009 | Kobayashi | G06F 3/03542 178/18.01 |
| 7,577,925 B2 | * | 8/2009 | Zotov | G06F 3/0418 345/173 |
| 7,719,515 B2 | * | 5/2010 | Fujiwara | G06F 3/03545 345/156 |

(Continued)

FOREIGN PATENT DOCUMENTS

| | | |
|---|---|---|
| CN | 101072399 A | 11/2007 |
| CN | 102209063 A | 10/2011 |

(Continued)

OTHER PUBLICATIONS

Chinese Office Action dated Feb. 16, 2015 regarding Chinese application 201410080825.9. Translation provided by Unitalen Attorneys at Law.

*Primary Examiner* — Hemant Patel
(74) *Attorney, Agent, or Firm* — Harness, Dickey & Pierce, P.L.C.

(57) ABSTRACT

An information processing method and an electronic device are provided, the method includes establishing, by a first electronic device, a call connection with a second electronic device through a first channel; acquiring, by the first electronic device, an input track of a third electronic device; determining, by the first electronic device, whether the input track meets a switching condition; and transmitting first switching information through the first channel in a case that said determining indicates that the input track meets the switching condition, the first switching information includes information for switching interfaces on the second electronic device.

14 Claims, 4 Drawing Sheets

(56) References Cited

U.S. PATENT DOCUMENTS

| | | | | |
|---|---|---|---|---|
| 7,978,838 B2 * | 7/2011 | Rodman | ................ | H04L 12/66 370/260 |
| 8,284,167 B2 * | 10/2012 | Li | ........................ | G06F 3/0483 345/173 |
| 2001/0000666 A1 * | 5/2001 | Wood | ................ | G06F 3/03545 345/179 |
| 2007/0119698 A1 * | 5/2007 | Day | ........................ | G06F 3/038 200/510 |
| 2008/0309641 A1 * | 12/2008 | Harel | ................... | G06F 3/0418 345/173 |
| 2014/0111600 A1 * | 4/2014 | Schaefer | ................ | H04N 5/232 348/14.08 |

FOREIGN PATENT DOCUMENTS

| | | |
|---|---|---|
| CN | 102929451 A | 2/2013 |
| CN | 203299786 U | 11/2013 |

* cited by examiner

INFORMATION PROCESSING METHOD AND ELECTRONIC DEVICE

This application claims the priority to Chinese Patent Application No. 201410080825.9, entitled "INFORMATION PROCESSING METHOD AND ELECTRONIC DEVICE", filed with the Chinese Patent Office on Mar. 6, 2014, which is incorporated by reference in its entirety herein.

FIELD

The disclosure relates to the field of information processing technology, and in particular to an information processing method and an electronic device.

BACKGROUND

To improve communication efficiency and avoid information distortion, the market of telephone conferences booms in recent years and the telephone conference is widely used in various enterprises. The telephone conference is a new way of conference mode in which a telephone is used as a tool and a telephone line is used as a carrier for the conference. However, communication efficiency of the telephone conference is not high. For example, if a participant wants to describe a graph, a lot of words are needed.

A face-to-face (F2F) conference is much more efficient comparing with the telephone conference. In the F2F conference, a participant may express ideas clearly and intuitively by marking or writing on a board. However, it is hard to do so in the telephone conference.

SUMMARY

An embodiment of the present disclosure provides a method for information processing, the method comprises: establishing, by a first electronic device, a call connection with a second electronic device through a first channel; acquiring, by the first electronic device, an input track of a third electronic device; determining, by the first electronic device, whether the input track meets a switching condition; and transmitting first switching information through the first channel in a case that said determining indicates that the input track meets the switching condition, where the first switching information includes information for switching interfaces on the second electronic device from a first interface to a second interface.

An embodiment of the present disclosure provides an electronic device, the electronic device comprises: a communication unit, which establishes a call connection with a second electronic device through a first channel; an acquiring unit, which acquires an input track of a third electronic device; a first determining unit, which determines whether the input track meets a switching condition; and a first transmitting unit, which transmits first switching information through the first channel in a case that the input track meets the switching condition, the first switching information comprises information for switching interfaces on the second electronic device from a first interface to a second interface.

BRIEF DESCRIPTION OF THE DRAWINGS

To describe the technical solutions of the embodiments of the present disclosure or technical solutions in the conventional technology more clearly, drawings involved in the embodiments of the present disclosure or the conventional technology are described below briefly. Apparently, the drawings described below are merely embodiments of the disclosure, and persons of ordinary skill in the art can obtain other drawings according to these drawings without any creative effort.

DETAILED DESCRIPTION

Technical solutions of the embodiments of the present disclosure will be illustrated below completely and clearly with the drawings of the embodiments of the disclosure. Apparently, the described embodiments are merely a few rather than all of the embodiments of the present disclosure. All other embodiments obtained by persons of ordinary skill in the art based on the embodiments of the present disclosure without creative efforts shall fall within the protection scope of the present disclosure.

Figure 1:
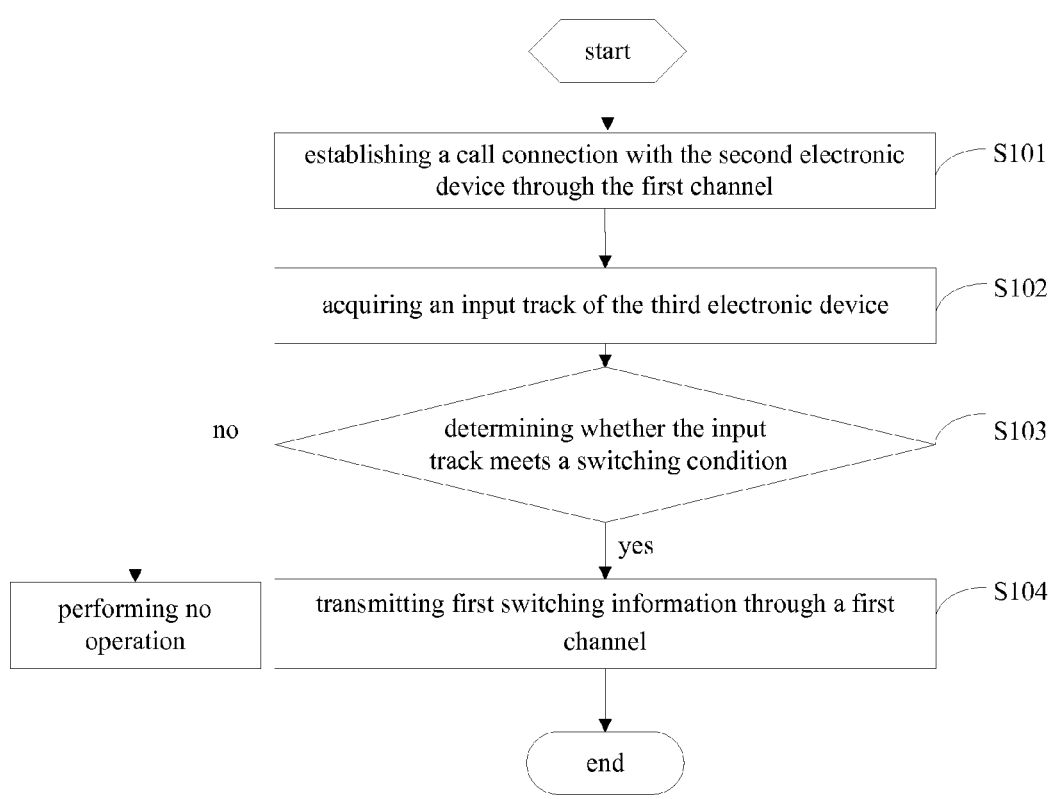
FIG. 1 is a schematic flow chart of an information processing method according to an embodiment of the disclosure.

FIG. 1 is a schematic flow chart of an information processing method according to an embodiment of the disclosure. The method is applicable to a first electronic device. The first electronic device performs data interaction through a third electronic device, and the first electronic device performs call connection with at least one second electronic device through a first channel. The method may include following S101 to S104.

S101 may include, establishing a call connection with the second electronic device through the first channel.

S102 may include, acquiring an input track of a third electronic device.

The input track of the third electronic device is acquired by the first electronic device through a detecting unit.

S103 may include, determining whether the input track meets a switching condition, and acquiring a determining result.

S104 may include, in a case that the determining result indicates that the input track meets the switching condition, transmitting first switching information through the first channel.

The first switching information is configured to switch interfaces on the second electronic device from the first interface to a second interface. The first interface is a call interface, and the second interface is an interface displaying content input by the third electronic device.

While the first electronic device transmits the first switching information to the second electronic device, the input track of the third electronic device is transmitted to the second electronic device through the first channel, so that the second electronic device may display the content input by the third electronic device on the second interface according to the received input track.

It should be noted that during an input operation performed by the third electronic device, the first electronic device acquires the input track of the third electronic device in real time and transmits the acquired input track to the second electronic device, so that the second electronic device may update the content displayed on the second interface in real time, therefore the content displayed on the second interface may be synchronized with the input of the third electronic device.

In the information processing method according to the embodiment of the disclosure, during the call connection between the first electronic device and the second electronic device, the first electronic device may acquire the input track of the third electronic device and transmit the switching information to the second electronic device in a case that the input track meets the switching condition, so that an interface of the second electronic device is switched from a call interface to an interface displaying content input by the third electronic device. Through the information processing method according to the embodiments of the disclosure, a user can present his ideas to the other party in a way such as marking and writing on a board during a call, and thus user experience is good.

Figure 2:
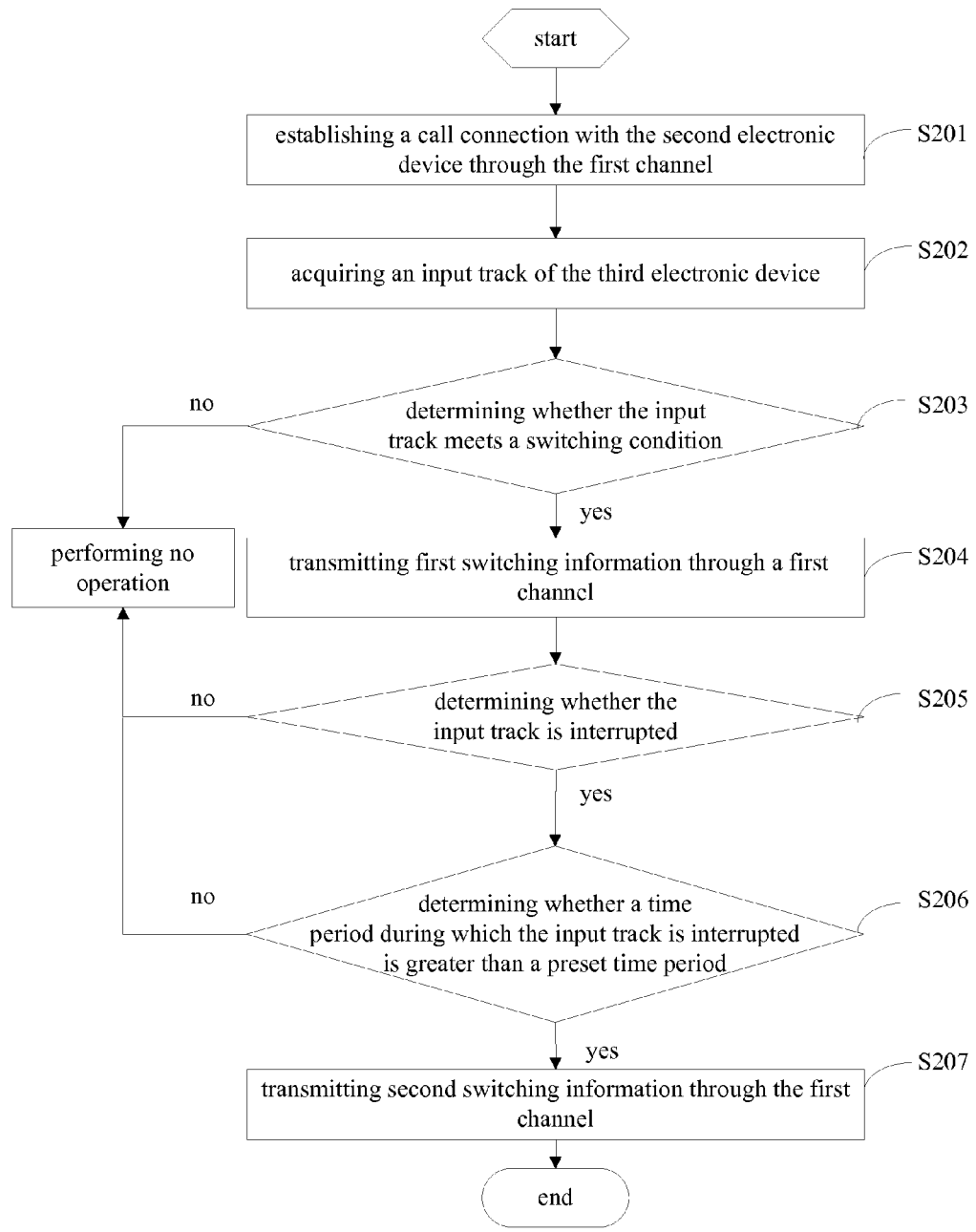
FIG. 2 is another schematic flow chart of an information processing method according to an embodiment of the disclosure.

FIG. 2 is a schematic flow chart of another information processing method according to an embodiment of the disclosure. The method is applicable to a first electronic device. The first electronic device performs data interaction through a third electronic device, and the first electronic device performs call connection with at least one second electronic device through a first channel. The method may include following S201 to S207.

S201 may include, establishing a call connection with the second electronic device through the first channel.

S202 may include, acquiring an input track of the third electronic device.

The input track of the third electronic device is acquired by the first electronic device through a detecting unit.

S203 may include, determining whether the input track of the third electronic device meets a switching condition, and acquiring a determining result.

S204 may include, in a case that the determining result indicates that the input track of the third electronic device meets the switching condition, transmitting first switching information through the first channel.

The first switching information is configured to switch interfaces on the second electronic device from the first interface to a second interface. The first interface is a call interface, and the second interface is an interface displaying content input by the third electronic device.

While the first electronic device transmits the first switching information to the second electronic device, the input track of the third electronic device is transmitted to the second electronic device through the first channel, so that the second electronic device may display the content input by the third electronic device on the second interface according to the received input track.

It should be noted that during an input operation performed by the third electronic device, the first electronic device acquires the input track of the third electronic device in real time and transmits the acquired input track to the second electronic device, so that the second electronic device may update the content displayed on the second interface in real time, therefore the content displayed on the second interface may be synchronized with the input of the third electronic device.

S205 may include, determining whether the input track of the third electronic device is interrupted.

It should be noted that the process of determining whether the input track of the third electronic device is interrupted is to determine whether the input of the third electronic device is finished.

S206 may include, in a case that the input track of the third electronic device is interrupted, determining whether a time period during which the input track is interrupted is greater than a preset time period.

There are two possible cases for the interruption of the input track of the third electronic device. In one case, the interruption refers to a short pause in the input of the third electronic device. In the other case, the interruption refers to the finish of the input of the third electronic device.

In an implementation, the third electronic device is an ultrasonic pen, and a user can use the ultrasonic pen to write on a board. It may be understood that during a process of using the ultrasonic pen to write by a user, an input track of the ultrasonic pen is usually discontinuous since the user may have a short pause when writing a stoke or a character, in this case, the input track of the ultrasonic pen is interrupted, and this kind of interruption during writing usually has a short time period. Therefore, whether the input of the electronic device is finished may be determined according to the time period during which the input track of the ultrasonic pen is interrupted.

S207 may include, in a case that the time period during which the input track is interrupted is greater than or equal to a preset time period, transmitting second switching information through the first channel.

The second switching information is configured to switch the second interface to the first interface for the second electronic device.

In a case that the time period during which the input track of the third electronic device is interrupted is greater than or equal to the preset time period, it is indicated that the input of the third electronic device is finished. In this case, the second switching information may be transmitted to the second electronic device, so that the interface of the second electronic device is switched to the first interface.

It should be noted that in a case that the time period during which the input track of the third electronic device is interrupted is less than the preset time period, it is indicated that the input of the third electronic device is not finished. In this case, no operation is performed.

In the information processing method according to the embodiment of the disclosure, during the call connection between the first electronic device and the second electronic device, the input track of the third electronic device may be acquired, and in a case that the input track meets the switching condition, the first switching information is transmitted to the second electronic device, so that the interface of the second electronic device is switched from the call interface to an interface displaying content input by the third electronic device. In addition, the first electronic device may also detect whether the input track of the third electronic device is interrupted, and in a case that the time period during which the input of the third electronic device is interrupted is greater than the preset time period, the second switching information is transmitted to the second electronic device, so that the interface of the second electronic device is switched from the second interface to the first interface. Through the information processing method according to the embodiment of the disclosure, a user can present his ideas to the other party in a way such as marking and writing on a board during a call, and after the user finishes the writing, the interface may be switched back to the call interface, and thus user experience is good.

It should be noted that, during a process of inputting by a user through using the third electronic device, the content input by the user through using the third electronic device may also be displayed on the first electronic device, so that the user can know the displaying of the input content on the second electronic device.

In the method according to any one of the above embodiments, the first electronic device displays the third interface in the call connection, and the method according to any one of the above embodiments may further include: in a case that the determining result indicates that the input track meets the switching condition, the third interface is switched to the fourth interface which displays the same content as the second interface, where the third interface is the call interface, and the fourth interface is an interface displaying input content of the third electronic device.

It should be noted that the third electronic device according to any one of the above embodiments may be provided with an infrared transmitter and an ultrasonic transmitter, and the detecting unit of the first electronic device may include an infrared receiver and an ultrasonic receiver accordingly.

The process of acquiring the input track of the third electronic device may include: receiving an infrared signal transmitted by the infrared transmitter through the infrared receiver and receiving an ultrasonic signal transmitted by the ultrasonic transmitter through the ultrasonic receiver, where a time at which the infrared signal is transmitted by the infrared transmitter is the same as a time at which the ultrasonic signal is transmitted by the ultrasonic transmitter; and determining the input track of the third electronic device based on a time at which the infrared signal is received, a time at which the ultrasonic signal is received, transmission speed of the ultrasonic signal and a position where the ultrasonic receiver is located. Specifically, there may be two ultrasonic receivers, which are disposed on different positions, a direction of the third electronic device may be determined by the first electronic device according to the ultrasonic signals received by the two ultrasonic receivers, and a distance between the first electronic device and the third electronic device is calculated according to a time difference between the time at which the infrared signal is received and the time at which the ultrasonic signal is received, so as to determine the input track of the third electronic device.

After acquiring the input track of the third electronic device, it is determined whether the input track of the third electronic device meets the switching condition. There are several implementations for determining whether the input track of the third electronic device meets the switching condition.

In one possible implementation, the process of determining whether the input track meets the switching condition includes: determining whether the infrared receiver receives the infrared signal transmitted by the third electronic device through the infrared transmitter, determining that the input track of the third electronic device meets the switching condition in a case that the infrared receiver receives the infrared signal transmitted by the third electronic device through the infrared transmitter, and determining that the input track of the third electronic device does not meet the switching condition in a case that the infrared receiver does not receive the infrared signal transmitted by the third electronic device through the infrared transmitter.

For example, the third electronic device is an ultrasonic pen provided with an infrared transmitter and an ultrasonic transmitter, and the ultrasonic pen is also provided with a piezoelectric film and a trigger device. In a case that a user uses the ultrasonic pen to write on a board, the piezoelectric film is pressed, so that the trigger device triggers the infrared transmitter to transmit an infrared signal and triggers the ultrasonic transmitter to transmit an ultrasonic signal. In a case that the first electronic device receives the infrared signal transmitted by the ultrasonic pen, the first switching information is transmitted to the second electronic device through the first channel, so that the interface of the second electronic device is switched from the first interface to the second interface, and the second interface displays content written on the board by the user using the ultrasonic pen.

It may be understood that, in some occasions, the user may not want to present his ideas to the other party by writing on a board but unconsciously touch the board by the ultrasonic pen, in this case, the first electronic device still receives the infrared signal and transmits the switching information to the second electronic device after receiving the infrared signal, so that the interface of the second electronic device is switched to the second interface, which is an error switching.

To avoid the error switching, in another possible implementation, the process of determining whether the input track meets the switching condition includes: determining whether the infrared receiver receives the infrared signal transmitted by the third electronic device through the infrared transmitter, determining whether a length of the input track of the third electronic device is greater than a preset value in a case that the infrared receiver receives the infrared signal transmitted by the third electronic device through the infrared transmitter, determining that the input track of the third electronic device meets the switching condition if the length of the input track is greater than the preset value, and determining that the input track of the third electronic device does not meet the switching condition if the length of the input track of the third electronic device is not greater than the preset value.

For example, the third electronic device is also the ultrasonic pen. In a case that the first electronic device receives an infrared signal transmitted by the ultrasonic pen through the infrared transmitter, the infrared signal may be caused by writing on the board by a user using the ultrasonic pen, or the infrared signal may be caused by touching the board by the user using the ultrasonic pen unconsciously. In this case, it can not be determined whether to transmit switching information to the second electronic device. Therefore, the first electronic device makes a determination by the length of the input track of the ultrasonic pen. In a case that the length of the input track of the ultrasonic pen is greater than or equal to a preset value, it may be determined that the user writes on the board by using the ultrasonic pen, and in this case, the first electronic device transmits first switching information to the second electronic device through the first channel, to make the interface of the second electronic device switched from a first interface to a second interface. In a case that the length of the input track of the ultrasonic pen is less than the preset value, it may be determined that the user touches the board by using the ultrasonic pen unconsciously, and in this case, the switching information is not transmitted to the second electronic device.

Figure 3:
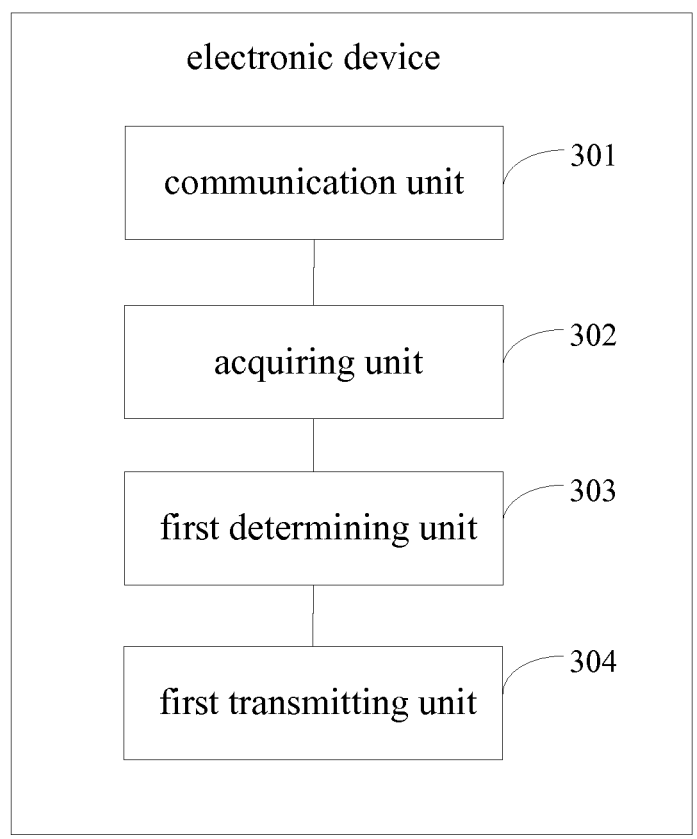
FIG. 3 is a schematic structural diagram of an electronic device according to an embodiment of the disclosure.

Corresponding to the method according to the above embodiments of the disclosure, an electronic device is further provided according to an embodiment of the disclosure. FIG. 3 is a schematic structural diagram of an electronic device according to an embodiment of the disclosure. The electronic device is configured as a first electronic device. The first electronic device performs data interaction through a third electronic device, and the first electronic device performs call connection with at least one second electronic device through a first channel. The first electronic device may include a communication unit 301, an acquiring unit 302, a first determining unit 303 and a first transmitting unit 304.

The communication unit 301 is configured to establish a call connection with the second electronic device through the first channel.

The acquiring unit 302 is configured to acquire an input track of the third electronic device, where the input track is acquired by the first electronic device through a detecting unit.

The first determining unit 303 is configured to determine whether the input track detected by the acquiring unit 302 meets a switching condition, and acquire a determining result.

The first transmitting unit 304 is configured to, in a case that the determining result acquired by the first determining unit 303 indicates that the input track meets the switching condition, transmit first switching information through the first channel.

The first switching information is configured to switch interfaces on the second electronic device from the first interface to a second interface.

In the embodiment of the disclosure, during the call connection between the first electronic device and the second electronic device, the input track of the third electronic device may be acquired, and in a case that the input track meets the switching condition, switching information is transmitted to the second electronic device, so that the interface of the second electronic device is switched from a call interface to an interface displaying content input by the third electronic device. By using the electronic device according to the embodiment the disclosure, a user can present his ideas to the other party in a way such as marking and writing on a board during a call, and thus user experience is good.

Figure 4:
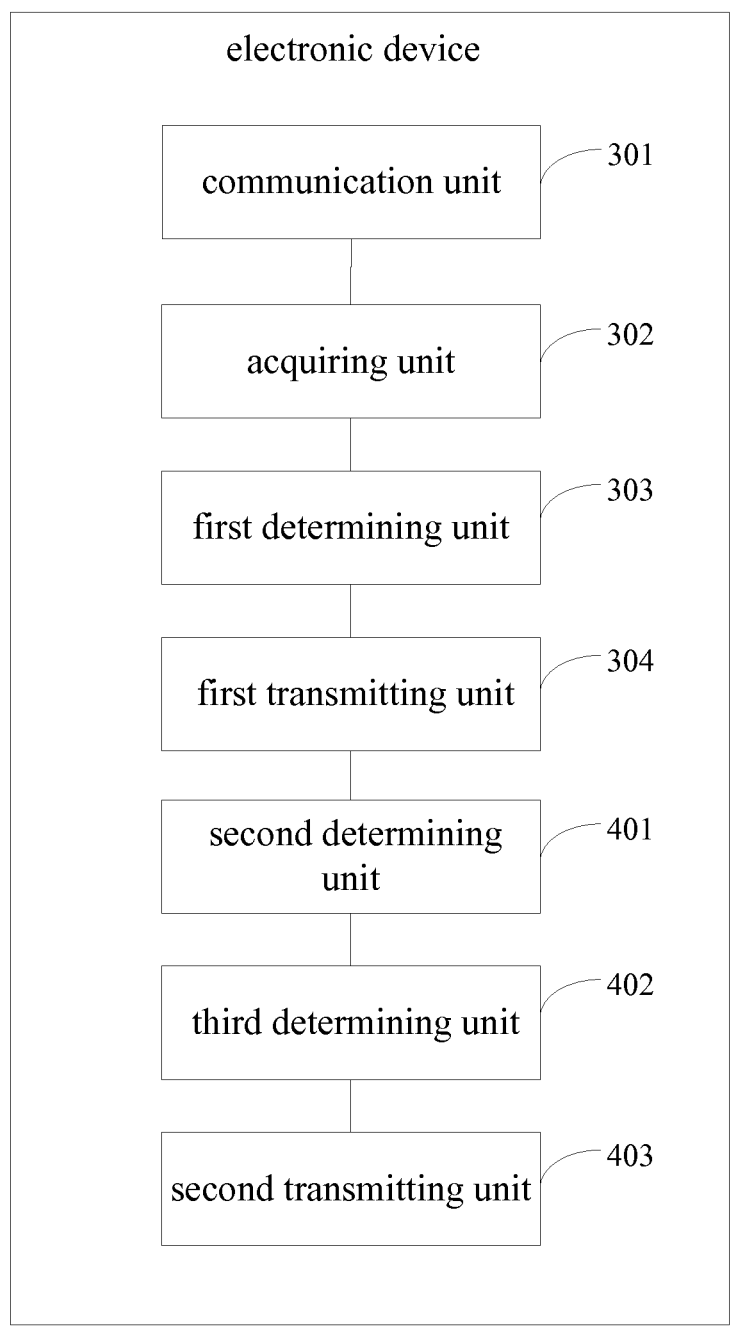
FIG. 4 is another schematic structural diagram of an electronic device according to an embodiment of the disclosure.

FIG. 4 is another schematic structural diagram of an electronic device according to an embodiment of the disclosure. The electronic device is configured as a first electronic device. The first electronic device performs data interaction through a third electronic device, and the first electronic device performs call connection with at least one second electronic device through a first channel. The first electronic device according to the embodiment of the disclosure differs from the electronic device according the above embodiment of the disclosure in that, the first electronic device further includes a second determining unit 401, a third determining unit 402 and a second transmitting unit 403, besides the communication unit 301, the acquiring unit 302, the first determining unit 303 and the first transmitting unit 304.

The second determining unit 401 is configured to detect whether the input track of the third electronic device is interrupted.

The third determining unit 402 is configured to determine whether a time period during which the input track is interrupted is greater than a preset time period in a case that the second determining unit 401 detects that the input track of the third electronic device is interrupted.

The second transmitting unit 403 is configured to, in a case that the second determining unit 402 determines that the time period during which the input track is interrupted is greater than or equal to the preset time period, transmit second switching information through the first channel, where the second switching information is configured to switch the second interface to the first interface for the second electronic device.

In the embodiment of the disclosure, during the call connection between the first electronic device and the second electronic device, the input track of the third electronic device may be acquired, and in a case that the input track meets the switching condition, first switching information is transmitted to the second electronic device, so that the interface of the second electronic device is switched from a call interface to an interface displaying content input by the third electronic device. In addition, the first electronic device may further detect whether the input track of the third electronic device is interrupted, and in a case that the time period during which the input track of the third electronic device is interrupted is greater than the preset time period, the second switching information may be transmitted to the second electronic device, so that the interface of the second electronic device is switched from the second interface to the first interface. By using the electronic device according to the embodiment of the disclosure, a user can present his ideas to the other party in a way such as marking and writing on a board during a call, and after the user finishes the writing, the interface may be switched back to the call interface, and thus user experience is good.

The third electronic device according to any one of the above embodiments may be provided with an infrared transmitter and an ultrasonic transmitter, and in the electronic device according to any one of the above embodiments, the detecting unit may include an infrared receiver and an ultrasonic receiver.

The first electronic device displays a third interface in the call connection, and the electronic device according to any one of the above embodiments further includes a switching unit.

The switching unit is configured to switch the third interface to the fourth interface in a case that the determining result indicates that the input track meets the switching condition, where displayed content of the fourth interface is the same as displayed content of the second interface.

The acquiring unit 301 of the electronic device according to the above embodiment of the disclosure may include a receiving subunit and a determining subunit.

The receiving subunit is configured to receive, by the infrared receiver, an infrared signal transmitted by the infrared transmitter, and receive, by the ultrasonic receiver, an ultrasonic signal transmitted by the ultrasonic transmitter, and a time at which the infrared signal is transmitted by the infrared transmitter is the same as a time at which the ultrasonic signal is transmitted by the ultrasonic transmitter.

The determining subunit is configured to determine the input track of the third electronic device based on a time at which the infrared signal is received, a time at which the ultrasonic signal is received, transmission speed of the ultrasonic signal and a position where the ultrasonic receiver is located.

The first determining unit 303 of the electronic device according to the above embodiment is configured to determine whether the infrared receiver receives the infrared signal transmitted by the infrared transmitter, determine that the input track meets the switching condition in a case that the infrared receiver receives the infrared signal, and determine that the input track does not meet the switching condition in a case that the infrared receiver does not receive the infrared signal; or the first determining unit 303 is configured to determine whether the infrared receiver receives the infrared signal transmitted by the infrared transmitter, determine whether a length of the input track is greater than a preset value in a case that the infrared receiver receives the infrared signal, determine that the input track meets the switching condition if the length of the input track is greater than the preset value, and determine that the input track dose not meet the switching condition in a case that the length of the input track is not greater than the preset value.

It should be noted that the embodiments of the present disclosure are described in a progressive manner, and each embodiment places emphasis on the difference from other embodiments, therefore, one embodiment can refer to other embodiments for the same or similar parts. For the embodiments of the device or the system, since the embodiments of the device or the system is very similar to the embodiments of the method, the description is relative simple, and relative description may refer to parts of description of the embodiments of the method.

It should also be noted that a relationship term such as "the first" and "the second" herein is only used to distinguish one entity or operation from another entity or operation, and does not necessarily require or imply that there is an actual relationship or sequence between these entities or operations. Furthermore, terms "include", "comprise" or any other variations are intended to cover non-exclusive "include", so that a process, a method, an object or a device including a series of factors not only includes the factors, but also includes other factors not explicitly listed, or also includes inherent factors of the process, the method, the object or the device. Without more limitation, a factor defined in a sentence "include one . . . " does not exclude a case that there is also another same factor in the process, the method, the object or the device including the described factor.

The steps of the method or the algorithm described according to the embodiment of the disclosure may be directly implemented by using hardware, a software module executed by a processor or a combination of the hardware and the software. The software may be disposed in a random access memory (RAM), a memory, a read-only memory (ROM), an electrically programmable ROM, an electrically erasable programmable ROM, a register, a hardware, a removable disk, a CD-ROM or a storage medium in any other forms known in the art.

According to the description of the disclosed embodiments, the disclosure may be implemented or used by the person skilled in the art. Various modifications made to these embodiments are apparent for persons skilled in the art, and a normal principle defined in the disclosure may be implemented in other embodiments without departing from spirit or scope of the disclosure. Therefore, the disclosure is not limited to the embodiments described in the disclosure but should confirm to a widest scope in accordance with principles and novel features disclosed in the disclosure.

The invention claimed is:

1. A method comprising:
   establishing, by a first electronic device, a call connection with a second electronic device through a first channel;
   acquiring, by the first electronic device, an input track of a third electronic device;
   determining, by the first electronic device, whether the input track meets a switching condition; and
   transmitting first switching information through the first channel in a case that said determining indicates that the input track meets the switching condition, wherein the first switching information comprises information for switching interfaces on the second electronic device from a first interface to a second interface.

2. The method according to claim 1, wherein said acquiring comprises:
   receiving an infrared signal and an ultrasonic signal transmitted by the third electronic device, wherein a time at which the infrared signal is transmitted is substantially the same as a time at which the ultrasonic signal is transmitted; and
   determining the input track of the third electronic device based on a time at which the infrared signal is received, a time at which the ultrasonic signal is received, a transmission speed of the ultrasonic signal and a position where an ultrasonic receiver is located for receiving the ultrasonic signal.

3. The method according to claim 1, wherein said determining comprises:
   determining whether an infrared signal transmitted by the third electronic device is received; and
   determining that the input track meets the switching condition in a case that the infrared signal is received.

4. The method according to claim 1, wherein said determining comprises:
   determining whether an infrared signal transmitted by the third electronic device is received;
   determining whether a length of the input track is greater than a preset value in a case that the infrared signal is received; and
   determining that the input track meets the switching condition if the length of the input track is greater than the preset value.

5. The method according to claim 1, wherein said switching interfaces comprises:
   switching from the first interface corresponding to the call connection, to the second interface corresponding to the input track.

6. The method according to claim 1, further comprising:
   switching interfaces on the first electronic device from a third interface to a fourth interface, in a case that said determining indicates that the input track meets the switching condition, wherein displayed content of the fourth interface on the first electronic device is the same as displayed content of the second interface on the second electronic device.

7. The method according to claim 1, further comprising:
   determining whether the input track of the third electronic device is interrupted;
   determining whether a time period during which the input track is interrupted is greater than or equal to a preset time period, in a case that the input track is interrupted; and
   transmitting second switching information through the first channel, in a case that the time period during which the input track is interrupted is greater than or equal to the preset time period, wherein the second switching information comprises information to switch interfaces on the second electronic device from the second interface to the first interface.

8. An electronic device, comprising:
   a communication unit, which establishes a call connection with a second electronic device through a first channel;
   an acquiring unit, which acquires an input track of a third electronic device;
   a first determining unit, which determines whether the input track meets a switching condition; and
   a first transmitting unit, which transmits first switching information through the first channel in a case that the input track meets the switching condition, wherein the first switching information comprises information for switching interfaces on the second electronic device from a first interface to a second interface.

9. The electronic device according to claim 8, wherein the acquiring unit comprises:
a receiving subunit, which receives an infrared signal and an ultrasonic signal transmitted by the third electronic device, wherein a time at which the infrared signal is transmitted is substantially the same as a time at which the ultrasonic signal is transmitted; and
a determining subunit, which determines the input track of the third electronic device based on a time at which the infrared signal is received, a time at which the ultrasonic signal is received, a transmission speed of the ultrasonic signal and a position where an ultrasonic receiver is located for receiving the ultrasonic signal.

10. The electronic device according to claim 8, wherein the first determining unit is configured to determine whether an infrared signal transmitted by the third electronic device is received, and determine that the input track meets the switching condition in a case that the infrared signal is received.

11. The electronic device according to claim 8, wherein the first determining unit is configured to determine whether an infrared signal transmitted by the third electronic device is received, whether a length of the input track is greater than a preset value in a case that the infrared signal is received, and determine that the input track meets the switching condition if the length of the input track is greater than the preset value.

12. The electronic device according to claim 8, further comprising:
a switching unit, which switches interfaces on the first electronic device from a third interface to a fourth interface, in a case that the input track meets the switching condition, wherein displayed content of the fourth interface on the electronic device is the same as displayed content of the second interface on the second electronic device.

13. The electronic device according to claim 8, further comprising:
a second determining unit, which determines whether the input track of the third electronic device is interrupted;
a third determining unit, which determines whether a time period during which the input track is interrupted is greater than or equal to a preset time period in a case that the input track of the third electronic device is interrupted.

14. The electronic device according to claim 13, further comprising:
a second transmitting unit, which transmits second switching information through the first channel in a case that the time period during which the input track is interrupted is greater than or equal to the preset time period, wherein the second switching information comprises information to switch interfaces on the second electronic device from the second interface to the first interface.

* * * * *

UNITED STATES PATENT AND TRADEMARK OFFICE
CERTIFICATE OF CORRECTION

PATENT NO. : 9,509,851 B2
APPLICATION NO. : 14/487238
DATED : November 29, 2016
INVENTOR(S) : Xueyuan Zhang It is certified that error appears in the above-identified patent and that said Letters Patent is hereby corrected as shown below:

In the Claims

At Column 12, Claim 12, Line number 3, delete "first"

Signed and Sealed this
Twenty-third Day of May, 2017

Michelle K. Lee
*Director of the United States Patent and Trademark Office*